United States Patent Office 3,490,678
Patented Jan. 20, 1970

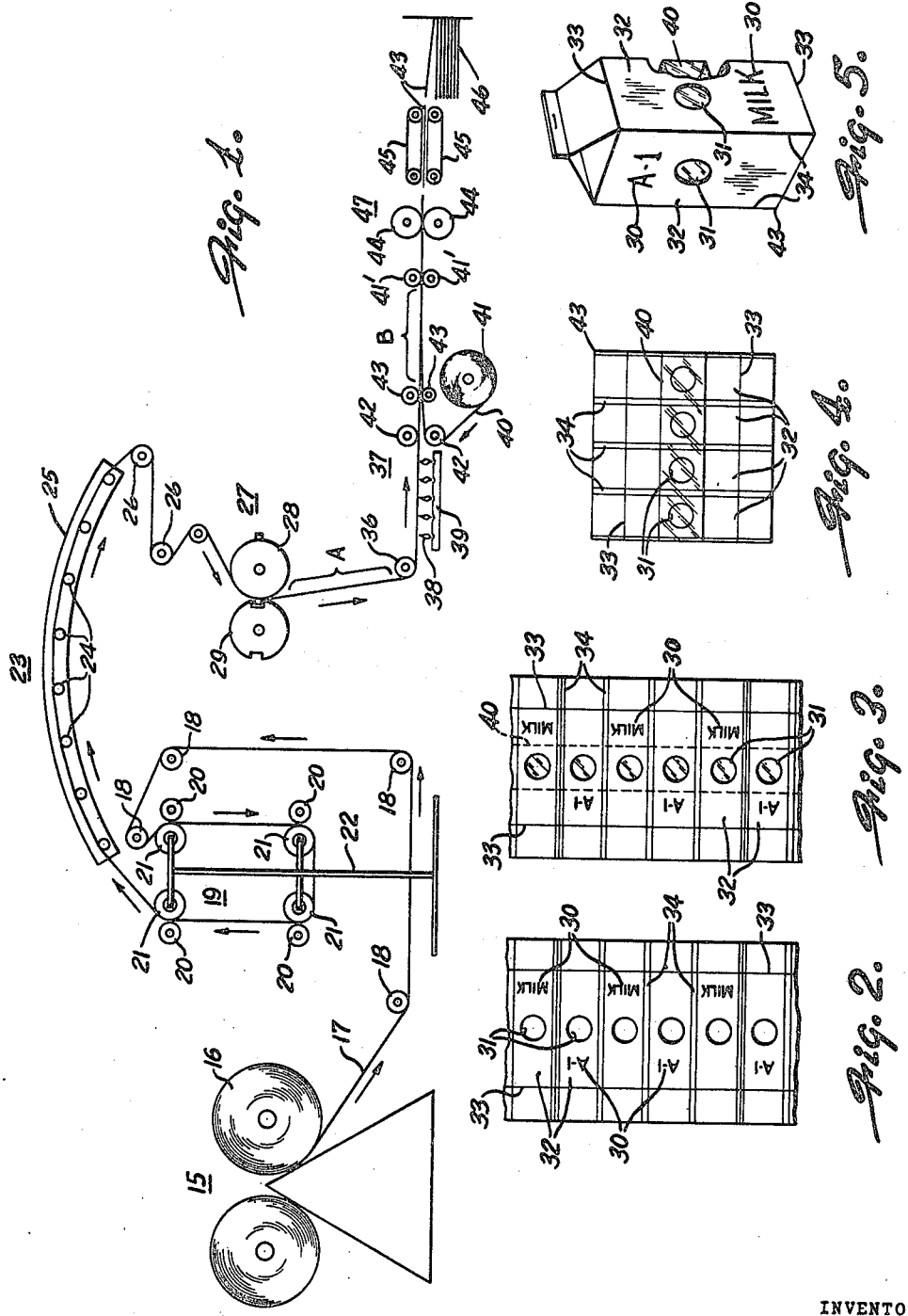

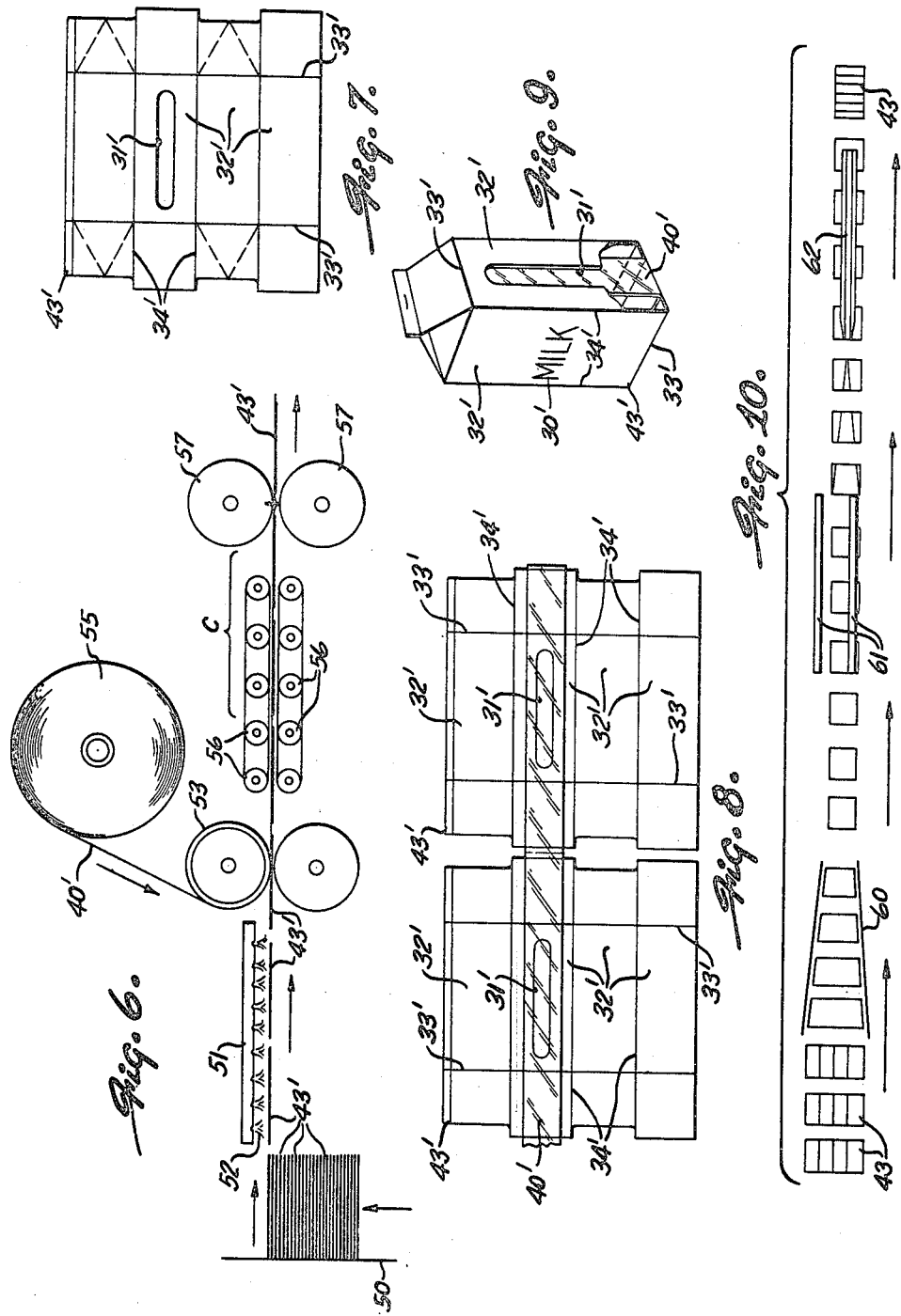

3,490,678
WINDOWED COMMODITY CONTAINER
Albert L. James, Hickory Corners, Mich., and William C. Heller, Jr., 3521 N. Shepard Ave., Milwaukee, Wis. 53211; said James assignor to said Heller
Original application Oct. 7, 1965, Ser. No. 493,680, now Patent No. 3,379,102. Divided and this application Feb. 6, 1968, Ser. No. 703,443
Int. Cl. B65d 5/40, 25/14, 5/56
U.S. Cl. 229—3.1    5 Claims

ABSTRACT OF THE DISCLOSURE

A paperboard container having at least one window opening in the base sheet entirely covered by a strip of transparent thermoplastic material adhered to the base sheet throughout the entire area of the strip.

---

This application is a division of United States application Ser. No. 493,680, filed Oct. 7, 1965, by Albert L. James and William C. Heller, Jr. and now U.S. Patent No. 3,379,102.

BACKGROUND

In the packaging industry, it has become common practice to provide disposable containers for liquids such as milk and juices for purposes of economy and convenience. Such disposable containers are commonly formed either of sheet materials such as paperboard which is suitably coated, impregnated or otherwise liquidproofed or of molded plastic. Also, these containers have heretofore been formed either with or without windows or sight openings for viewing the contents.

The plastic containers thus provided have recently enjoyed considerable commercial acceptance primarily due to the relatively attractive appearance and variance in designs thereof coupled with the ability to readily render the plastic transparent or translucent in whole or in part. However, the production methods and equipment required for fabricating these plastic containers is expensive and results in undesirably high costs which must be absorbed by the ultimate consumer. In addition, these plastic containers are of a fixed shape and are therefore bulky and incapable of being knocked down or folded, thereby causing shipping and storage problems. Furthermore, the application of printed matter to molded plastic bottles or the like sometimes presents problems, and the production of the containers is undesirably slow.

While the paperboard and laminated containers are capable of being produced rapidly and at relatively low cost with line production methods and machinery and are furtheremore readily receptive to printing applied by high speed presses, the paperboard base sheets are opaque and non-transparent and are incapable of being rendered transparent. Therefore, if window or sight openings are desired, they must be specially formed as by diecutting or the like, and the problem of covering the openings with a transparent material while maintaining liquidproofness is then presented.

Although various proposals have heretofore been presented for covering the window openings in paperboard cartons or containers with transparent materials, these prior methods and devices have been incapable of incorporation in or with existing high speed carton production methods and/or equipment. Also, the liquid cartons or containers previously provided with windows are not generally employed or accepted for various other reasons such as the need for utilizing adhesive or wax sealing in their production, the use of fragile and easily ruptured sheet materials for the window coverings, and the limitations requiring that the use of these prior devices be employed only in set-up or completely assembled cartons thus precluding use thereof in collapsed or knockdown type containers.

SUMMARY

It is therefore an important object of the present invention to provide an improved liquidproof container having window or sight openings therein, which obviates the aforesaid disadvantages and objections of existing devices of this general type.

Another object of this invention is to provide improvements in paperboard containers which permit the placement and covering of windows or sight openings in liquidproof cartons of the collapsible or knockdown type in order to facilitate shipment and storage thereof.

Still another object of the invention is to provide improvements in the formation of window openings and the covering of such openings in paperboard cartons which may be readily incorporated in and used with existing high speed production methods and equipment without undesirable results such as production slowdown, inferior consumer package, greatly increased costs or the like.

A further object of the present invention is to provide an improved window-type liquidproof container of sheet stock which is readily adaptable for rapid production in accordance with a novel method at minimum expense.

These and other objects and advantages of the invention will become apparent from the following detailed description.

THE DRAWINGS

A clear conception of the improved method and apparatus for producing window cartons embodying the improvements may be had by referring to the drawings accompanying and forming a part of this specification wherein like reference characters designate the several parts in the various views.

FIG. 1 is a more-or-less diagrammatic view illustrating the several steps of the preferred method of preparing web stock for the production of commodity cartons embodying the invention;

FIG. 2 is an enlarged plan view of a fragment of the web of carton-forming stock within the area A of FIG. 1;

FIG. 3 is a similarly enlarged plan view of another fragment of the web with the window covering applied thereto taken within the area B of FIG. 1;

FIG. 4 is another enlarged plan view of one of the finished printed, scored and cut carton blanks taken from the side opposite to that of FIGS. 2 and 3;

FIG. 5 is a perspective view of one of the cartons formed from the blank of FIG. 4 and showing the same in assembled condition;

FIG. 6 is a diagrammatic view of an alternate method for producing carton blanks from pre-cut stock;

FIG. 7 is an enlarged plan view of one of the typical pre-cut window blanks as employed in the method depicted in FIG. 6;

FIG. 8 is a similarly enlarged plan view of a pair of adjoining blanks taken at the area C of FIG. 6;

FIG. 9 is a perspective view of one of the assembled cartons formed from one of the blanks of FIG. 8; and FIG. 10 is a plan view illustrating the folding and sealing steps in the formation of final knocked down or collapsed back-seamed carton blanks resulting from either the preferred or the alternate method shown herein.

While the improvements have been shown and described herein as being embodied in a typical laminated paperboard milk carton printed, scored and folded in a certain manner and provided with window openings at specific locations, it is not intended or desired to thereby unnecessarily limit the invention by reason of such specific embodiments. It is also contemplated that certain descriptive terminology used herein shall be given the broadest possible interpretation consistent with the disclosure.

Referring now to the drawings and particularly FIG. 1 thereof, the numeral 15 designates generally the supply station for the laminated paperboard stock from which the cartons are formed. In the fabrication of milk cartons, the supply roll 16 generally consists of a dense and highly calendered paperboard base sheet of from 20 to 24 points, the web 17 having a width dependent upon the size of the cartons desired. In accordance with customary commercial practice, the base sheet is coated on both sides with a plastic such as polyethylene or the like in the density range of .924 to .930 by means of tandem extrusion coating equipment operating at speeds ranging from 500 feet per minute to 1200 feet per minute and at widths from 60 to 80 inches. Generally the side of the web which is to become the inside of the carton receives a 1 mil coating and the side which is to become the outside is coated to a somewhat lesser extent, usually about ¾ of a mil.

Either at the time of the extrusion coating or a separate operation, the outside or exterior coating is treated as by a heavy corona discharge to render the same receptive to printing. Also, the coating for the carton interior is given a matte finish to minimize blocking and facilitate sheet handling, such matte finish being attained as by means of a cooling cylinder having a sandblasted finish, such cooling cylinder being located at the laminating station and forming a part of the extrusion coating laminator. In addition, it is accepted practice in some cases to apply primers to the paperboard base sheet in advance of the extrusion coating stations to aid in the adhesion of the coatings. The laminated web thus formed is then slit and trimmed and is furnished to the carton manufacturer in rolls 16 for subsequent printing, scoring, cutting and set-up operations.

In producing the carton blanks as herein disclosed, there is no disturbance or interference whatsoever with the existing high speed extrusion coating and surface treatment operations thus described, nor are any modifications or changes required in the expensive equipment presently in use for performing these operations. Furthermore, the window openings may be readily formed in the web stock and the liquid-proof window coverings applied thereto with only slight modification or addition to existing equipment as used for printing, scoring and cutting the carton blanks from the pre-coated webs.

As shown in FIGURE 1, the coated web 17 is withdrawn from the supply roll 16 about guide rolls 18 to the printing press 19 which may be of the flexograph or other suitable type having a series of printing rollers 20 and backup rolls 21 carried by a suitable frame or standard 22 depicted diagrammatically. At this station 19, the surface of the web which is to become the outer or exterior surface of the carton is provided with the desired indicia applied directly to the external coating.

From the press 19, the web 17 is immediately advanced through a drier or oven 23. This drier is also illustrated diagrammatically and may be of any well known construction suitable for use in drying the printed surface of the advancing web 17 which is passed over a series of spaced rollers 24 within a heated jacket or enclosure 25 with its printed side up, and as the web leaves the drying oven 23, it is advanced in surface contact about a pair of offset chill rolls 26 to cool both sides.

In the production method shown in FIG. 1, the window openings are formed in the web 17 in the zone 27 as the web is advanced beyond the chill rolls 26. The rotary knife for cutting the window openings is diagrammatically illustrated as comprising a knife carrying cutting roll 28 and a backup roll 29 both geared and timed with the press. At this station, the windows of any desired configuration are cut in the advancing printed web 17 so as to be located in any one or more of the walls, including top, bottom or gusset panels as well as side walls, of the carton as desired. A fragment of the web 17 with printed matter 30 applied to the face thereof and with window openings 31 cut in the side wall panels 32 as defined by score lines 33, 34 is shown in FIG. 2, this view being taken in zone A of FIG. 1 but with wall forming score lines added for the sake of illustration.

The web 17, printed as described and with window openings formed therein is then advanced about a guide roll 36 through a heating and tape applying zone 37. In this zone, the unprinted side of the web 17 is first subjected directly to a gas flame 38 from a burner 39 or the like to activate the polyethylene coating along a band of desired width extending longitudinally of the web and across and beyond the window openings 31. Immediately thereafter, the window covering in the form of a polyethylene tape 40 is applied to the heated area, the tape being continuously supplied from a roll 41 between the nip rolls 42 with additional pressure being subsequently applied by a pair of pressure rolls 43. A fragment of the web at this state is shown in FIG. 3 which is taken in area B of FIG. 1 after the tape 40 has been applied to the web to cover the window openings 31.

Finally, upon leaving the tape applying zone 37, the web 17 is advanced by the rolls 41' to the final scoring, cut-off and delivery zone 47 wherein the web is scored longitudinally and transversely as at 33, 34 and the successive carton blanks 43 are cut from the web by means of cooperating rotary scoring and cutting rollers 44, the cut blanks being delivered by a suitable feeder 45 to a stacker 56. These blanks as shown in FIG. 4 are then folded and seam-sealed for shipment to the dairies in flat folded condition, the knocked-down cartons being assembled as shown in FIG. 5 at the dairy. From FIGS. 1 to 5 inclusive, it is apparent that the window openings are formed in the side wall panels of the coated carton forming stock as it is advanced in web form and following the printing operations. Also, the window openings are covered by the subsequent application of a continuous transparent tape applied longitudinally of the advancing web so as to extend transversely across the side wall panels of the cartons while spanning the window openings, the transparent covering being secured to the inner walls by heat and pressure prior to final severance of the successive blanks.

In the production method illustrated in FIGS. 6 to 8 inclusive, the operations are identical to those above described except for the elimination of zone 37 which includes the burner 39 and tape applicator 41, 42 and 43. In this alternate method, the web of coated carton stock is also withdrawn from the supply roll at the station 15 and is printed as described in zone 19 from which it is advanced through a drying zone 23 and then about chill rolls 26 and through the window forming zone 27. However, immediatey after leaving zone 27, the web 17 is advanced by the rolls 41' to the cutting and delivery zone 47 wherein the web is scored at 33', 34' and the successive carton blanks are cut from the web by the rotary scoring and cutting rolls 44 and are delivered by feeder 45 to the stacker 46. Thus, the printed and scored carton blanks 43' have window openings 31' formed therein, but these windows are devoid of coverings as delivered to the stacker. Furthermore, in this embodiment, it is possible to eliminate the window forming cutters 28, 29 in zone 27 since these window perforations may be made in zone 47 by the rolls 44 at the same time as the scoring and cut-off operation.

To apply the window coverings to the carton blanks 43', a supply of the blanks is placed in stacked formation on a suitable lift 50 as shown in FIG. 6 with the unprinted sides facing up and with either the top or bottom ends of the cartons facing in the direction of the arrow. The blanks 43' are then fed in succession directly under the burner 51 with the flame 52 thereof activating the polyethylene coating of each carton blank along a band extending for the full length of the side wall panel 32' containing the window opening 31' and the adjoining end panels on the unprinted side of the blank. From the heating zone, the successive blanks are immediately advanced between the tape applicator and pressure rolls 53, 54 where a continuous tape 40' is withdrawn by the roll 53 from a tape supply roll 55 and is applied to the heated zones of the successive blanks. The blanks 43' joined by the transparent polyethylene tape 40' are then advanced between pressure rollers 56 to finally unite the tape to the successive blanks, and the tape 40' is then finally severed between carton blanks 43' by a rotary cutter 57 with the finished blanks being thereafter folded and side-seamed for shipment and subsequent assembly as shown in FIG. 9 wherein it is apparent that the transparent tape forming the liquid-proof window covering extends longitudinally of the side wall as distinguished from the carton of FIG. 5.

FIG. 10 diagrammatically illustrates a typical carton blank folding and side seaming operation which is well known in the art and requires no detailed explanation. In folding and side seaming either the blanks 43 or the blanks 43', these blanks are fed in succession with their printed sides down to a folder 60 where they are folded to a U-shaped configuration along two of the longitudinal panel-forming score lines. The free side edges of each carton which are to be superimposed are then subjected to flame heat by a burner or heater 61, and the cartons are next folded along the other longitudinal score lines to bring the heated edges into overlapping relation. Finally, the superimposed edges are pressed together by a series of pressure rollers and belts 62 to complete the tubes which are then collapsed for delivery in knocked down condition. While the folding and sealing of the successive carton blanks has been shown and described as a separate operation in and of itself, it should be noted that the application of the windows covering tape 40' (FIG. 6) may conveniently be combined with the back seam sealing operation of FIG. 10 by having the cut-off unit 57 (FIG. 6) feeding directly into the back seam unit 61 (FIG. 10).

It should be noted that the carton sections may be scored and severed either prior to or following the application of the transparent strip or tape, and the final carton forming blank may then be folded and seam sealed to provide a collapsible tube having the transparent strip located interiorly and running either transversely or longitudinally of the walls. The sheet may also have any desired printed indicia applied to one side thereof as it leaves the supply roll and is advanced toward the scoring and perforating zone, in which case the printing is dried prior to the perforating operation, and the strip of transparent material is then preferably applied to the unprinted side. Also, it is contemplated that the transparent window covering may be preprinted as and if desired.

While the heat for activating and sealing the thermoplastic tape to the base sheet has been specifically shown and described herein as being in the nature of a gas flame applied to the unprinted side of the base sheet, it should nevertheless be understood that any type of activating medium may be utilized and such medium may moreover be applied to the tape rather than to the sheet or to both the base sheet and tape without departing from the invention. Also, although the tape forming the window covering has been shown as extending for the full length and/or width of the carton blanks, this is not necessary and it may, in some instances, be desirable to terminate the tape short of the areas in which the carton walls are overlapped and/or sealed, thus eliminating the possibility of interference with such seals, providing more flexibility in choice of materials for the transparent tape, and resulting further in a saving on the tape material. However, in instances wherein the carton blanks are fabricated as shown with the tape extending into the seam or seal area, the tape must be selected and activated so as to seal not only to the side of the base sheet to which it is applied but also to the adjacent overlying seam forming portion of the base sheet, and the tape may be formed of such materials as polyethylene, coated cellophane or Mylar, polypropylene, or the like. It should also be understood that the base sheet may or may not be printed as desired and that the window covering may be preprinted with any desired indicia or may be coated or treated to minimize light seepage therethrough. Additionally, the window openings may be located within any desired area or areas, as in selected side or end walls or gusset areas, and may be of various shapes and sizes. Furthermore, it should be understood that the base sheet coating may be in the nature of an extrusion coating or a lamination of thermoplastic sheet material, and that the references to window forming perforation is intended to apply to any suitable cutting operation.

Various modes of carrying out the invention are contemplated as being within the scope of the following claims particularly pointing out and distinctly claiming the subject matter which is regarded as the invention.

We claim:

1. A liquid-proof container comprising, a paperboard sheet having a thermoplastic coating over its entire surface, said sheet being cut, scored and assembled to form a carton having wall panels and an unobstructed interior, at least one of said panels having an unobstructed window opening formed therein, and a preformed strip of transparent material of substantially less dimension than the coated paperboard sheet in at least one direction extending entirely across the window containing panel and completely covering the window opening interiorly of said carton, said strip being integrally secured by heat sealing over its entire area to said thermoplastically coated window containing panel completely about the unobstructed window opening therein, the seal providing the sole securement and support for said strip.

2. A liquid-proof container according to claim 1, wherein the transparent thermoplastic strip extends longitudinally across the window containing panel.

3. A liquid-proof container according to claim 1, wherein the window containing panel has adjoining end wall panels and the transparent thermoplastic strip extends longitudinally across the window containing panel and the adjoining end wall panels.

4. A liquid-proof container according to claim 1, wherein the transparent thermoplastic strip extends transversely across the window containing panel.

5. A liquid-proof container according to claim 1, wherein the window containing panel has adjoining side wall panels and the transparent thermoplastic strip extends transversely across the window containing panel and the adjoining side wall panels.

References Cited

UNITED STATES PATENTS

| | | | |
|---|---|---|---|
| 1,842,728 | 1/1932 | Molins. | |
| 1,907,067 | 5/1933 | Hartmann. | |
| 2,153,911 | 4/1939 | Benedetti | 229—7 XR |
| 2,294,473 | 9/1942 | Makely | 229—7 |
| 2,300,703 | 11/1942 | Ray | 229—17 |
| 2,321,660 | 6/1943 | Courtney | 229—7 XR |
| 2,353,178 | 7/1944 | Moore. | |
| 2,650,451 | 9/1953 | Karsteot | 229—7 XR |
| 3,189,246 | 6/1965 | Seline. | |

FOREIGN PATENTS 255,533 11/1964 Australia.

DAVIS T. MOORHEAD, Primary Examiner

U.S. Cl. X.R.

206—45.31; 229—14, 17